United States Patent
Schepmann et al.

(10) Patent No.: US 10,125,799 B2
(45) Date of Patent: Nov. 13, 2018

(54) SYSTEMS AND METHODS FOR MOUNTING OBJECTS TO A STRUCTURE

(71) Applicant: Proterra Inc., Greenville, SC (US)

(72) Inventors: Seneca A. Schepmann, Greenville, SC (US); William Golpe, Taylors, SC (US)

(73) Assignee: Proterra Inc., Burlingame, CA (US)

( * ) Notice: Subject to any disclaimer, the term of this patent is extended or adjusted under 35 U.S.C. 154(b) by 0 days.

(21) Appl. No.: 14/701,880

(22) Filed: May 1, 2015

(65) Prior Publication Data
US 2016/0319851 A1   Nov. 3, 2016

(51) Int. Cl.
| | |
|---|---|
| F16M 13/02 | (2006.01) |
| F16B 2/06 | (2006.01) |
| F16B 5/00 | (2006.01) |
| F16B 5/01 | (2006.01) |
| F16B 5/02 | (2006.01) |
| B60R 11/00 | (2006.01) |

(52) U.S. Cl.
CPC .............. F16B 2/065 (2013.01); B60R 11/00 (2013.01); F16B 5/0096 (2013.01); F16B 5/01 (2013.01); F16B 5/0208 (2013.01); F16M 13/02 (2013.01); B60R 2011/0059 (2013.01)

(58) Field of Classification Search
CPC .......... F16B 2/065; F16B 5/0096; F16B 5/01; F16B 5/0208; B60R 11/00; B60R 2011/0059; F16M 13/02
USPC ............. 248/231.85, 496, 477, 216.1, 216.4, 248/218.3, 220.21, 220.22, 223.31, 224.7, 248/229.1
See application file for complete search history.

(56) References Cited

U.S. PATENT DOCUMENTS

| | | | | |
|---|---|---|---|---|
| 2,695,770 A | * | 11/1954 | Stone | E21B 19/02 15/220.4 |
| 3,210,892 A | * | 10/1965 | Perham | B24B 45/006 403/258 |
| 3,252,493 A | * | 5/1966 | Smith | F16B 5/01 285/222 |
| 3,315,420 A | * | 4/1967 | Moberg | B24D 9/08 451/510 |
| 3,744,747 A | * | 7/1973 | Busch | B41J 29/04 248/573 |

(Continued)

FOREIGN PATENT DOCUMENTS

DE    10 2012 223 863 A1    6/2014

OTHER PUBLICATIONS

European Extended Search Report and Written Opinion, dated Sep. 8, 2016, in corresponding European Application No. 16167678.8.

*Primary Examiner* — Nkeisha Smith
(74) *Attorney, Agent, or Firm* — Bookoff McAndrews, PLLC

(57) ABSTRACT

A mounting system including a compressible structure having a first surface, a second surface, and at least one boss hole extending through the compressible structure from the first surface to the second surface. The system further including an interior plate mounted on the first surface of the compressible structure, wherein the interior plate includes a boss protruding from the interior plate and into the boss hole of the compressible structure, and an exterior plate mounted on the second surface of the compressible structure and secured to the interior plate against the boss of the interior plate, wherein the compressible structure is compressed a predetermined amount as a function of a length of the boss.

17 Claims, 7 Drawing Sheets

(56) References Cited

U.S. PATENT DOCUMENTS

| | | | |
|---|---|---|---|
| 3,977,146 A | 8/1976 | Wiley | |
| 4,015,371 A * | 4/1977 | Grayston | B24D 5/16 |
| | | | 451/342 |
| 4,541,205 A * | 9/1985 | Patrello | B24D 5/16 |
| | | | 451/342 |
| 5,171,099 A | 12/1992 | Westre | |
| 5,232,303 A * | 8/1993 | Rubner | A47B 13/021 |
| | | | 248/188 |
| 5,309,682 A * | 5/1994 | Gutknecht | B24D 9/085 |
| | | | 451/490 |
| 5,487,524 A * | 1/1996 | Bergetz | F16F 15/085 |
| | | | 248/343 |
| 7,637,686 B2 * | 12/2009 | Wood | B64C 1/066 |
| | | | 244/118.1 |
| 8,297,169 B2 * | 10/2012 | Kunda | F16B 5/025 |
| | | | 411/108 |
| 2003/0210516 A1 * | 11/2003 | Bernett | F16F 7/104 |
| | | | 361/679.36 |
| 2005/0087703 A1 * | 4/2005 | Merlo | G21K 1/02 |
| | | | 250/505.1 |
| 2006/0226188 A1 * | 10/2006 | Smith | B60R 9/04 |
| | | | 224/326 |
| 2008/0252033 A1 * | 10/2008 | Platner | B60G 11/10 |
| | | | 280/124.163 |
| 2014/0356063 A1 * | 12/2014 | Tung | F16B 2/065 |
| | | | 403/374.4 |

\* cited by examiner

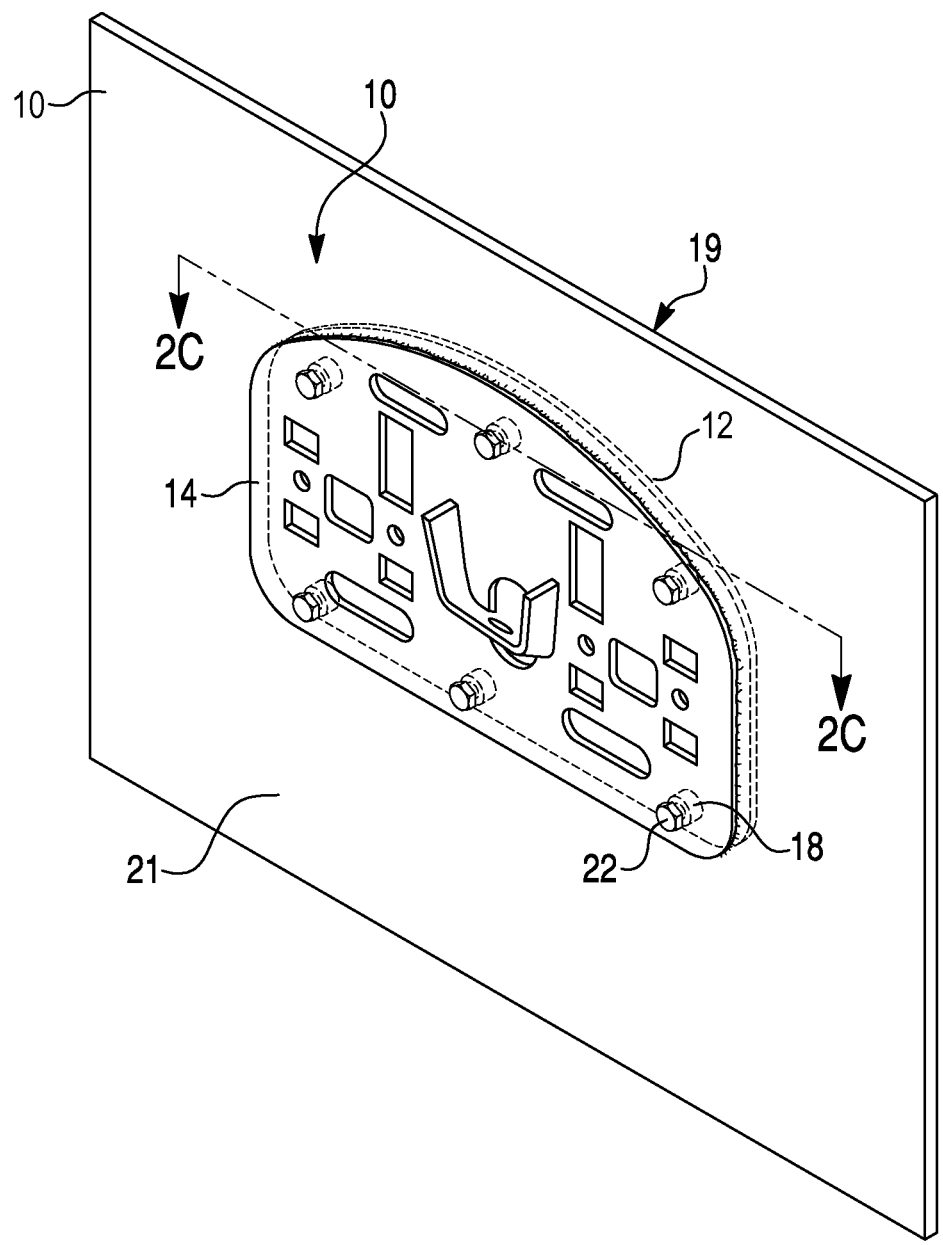

SYSTEMS AND METHODS FOR MOUNTING OBJECTS TO A STRUCTURE

TECHNICAL FIELD

The embodiments of the present disclosure relate to systems and methods for attaching objects to a structure.

BACKGROUND

Conventional methods for mounting objects to a structure, such as a composite vehicle body, require extensive composite hard points and the use of large metal structural members. Hard points come in different forms. Some hard points include a metal plate or structure that is formed within the composite structure to which exterior plates or structures are attached. Other hard points include a hard plate of composite material (like a solid sheet of fiberglass/resin composite with no soft core material) that is included within the composite structure for strength at desired attachment points. The formation of hard points in a composite structure can be expensive, heavy, and difficult to form.

Furthermore, conventional methods of attaching objects to a composite structure use large amounts of bonding agents to fill in uncontrolled gaps between the composite and an exterior mounting system, adversely affecting the cost and strength of the attachment. The strength of the attachment is affected because the bonding agent is typically directly in the load path.

In addition, conventional methods do not control compression of the composite when attaching a mounting system to the structure. Instead, the interface glue takes the compression and must support the bulk of the loading. Lack of control of the compression of the composite may result in a poor strength interface attachment.

SUMMARY

Embodiments of the present disclosure relate to, among other things, systems and methods for mounting objects to a compressible structure. Each of the embodiments disclosed herein may include one or more of the features described in connection with any of the other disclosed embodiments.

A mounting system including a compressible structure having a first surface, a second surface, and at least one boss hole extending through the compressible structure from the first surface to the second surface. The system further including an interior plate mounted on the first surface of the compressible structure, wherein the interior plate includes a boss protruding from the interior plate and into the boss hole of the compressible structure, and an exterior plate mounted on the second surface of the compressible structure and secured to the interior plate against the boss of the interior plate, wherein the compressible structure is compressed a predetermined amount as a function of a length of the boss.

A system for mounting objects to a composite structure of a vehicle including a composite structure having a first surface, a second surface, and a boss hole extending through the composite structure from the first surface to the second surface, an interior plate mounted on the first surface of the composite structure, wherein the interior plate includes a boss protruding from the interior plate and into the boss hole of the composite structure, and an exterior plate mounted on the second surface of the composite structure, wherein an inner surface of the exterior plate contacts an end surface of the boss. A portion of the composite structure between the interior plate and the exterior plate has a reduced thickness relative to a portion of the composite structure that is not between the interior plate and the exterior plate.

A method for installing a mounting system on a compressible structure including coupling an interior plate having a boss to a first surface of a compressible structure such that the boss protrudes from the interior plate and into a boss hole in the compressible structure, and coupling an installation fixture having a feature to a second surface of a compressible structure such that the feature protrudes from the installation fixture and into the boss hole in the compressible structure. The thickness of the feature corresponds to desired compression of the compressible structure.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description serve to explain the principles of the disclosure.

FIG. 1 is a schematic cross-section view of a completed mounting system installed on a compressible structure, according to an exemplary embodiment;

DETAILED DESCRIPTION

Overview

Figure 2A:
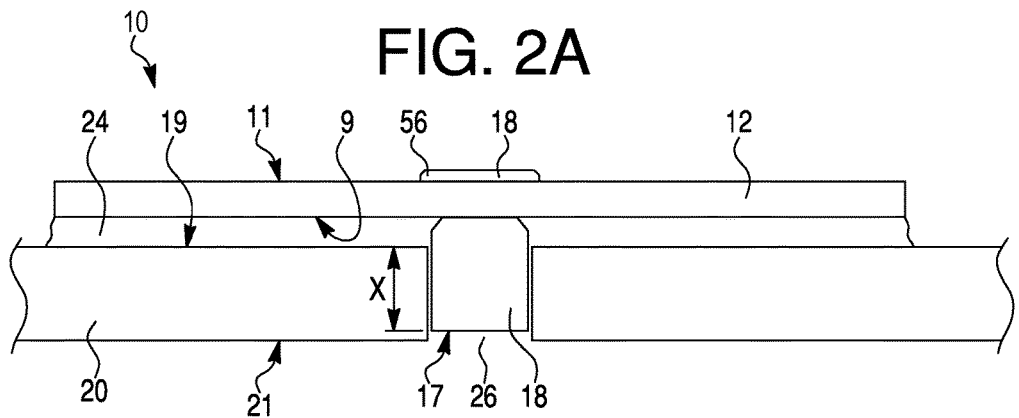
FIG. 2A is a schematic cross-section view of an interior plate coupled to a compressible structure, according to an exemplary embodiment.

Embodiments of the present disclosure relate to a mounting system for mounting objects to a compressible structure and related methods for installing the mounting system on the compressible structure.

Exemplary Embodiments

In the exemplary systems and methods described herein, different forms of words such as "coupling," "attaching," "mounting," and installing" are used to describe relationships between various components and the steps taken during various processes. The use of these different words is not intended to be limiting. For example, when two components are "coupled," they may be removably coupled or permanently coupled. Similarly, two "attached" components may be temporarily or permanently attached. "Mounting" and "installing" are used herein interchangeably to describe the general positioning of various components for use and are similarly not intended to be limiting. The terms "internal" and "external" and "interior" and "exterior" are used herein to reference opposite sides of a structure, but it is understood that elements described as "internal" or "interior" may be "external" or "exterior," and visa-versa.

FIG. 1 illustrates an embodiment of a mounting system 10 after it has been installed on a compressible structure 20. The mounting system 10 may be used to mount objects to the compressible structure 20. In one embodiment, the compressible structure 20 may be part of a vehicle chassis (i.e., body), such as the body of a bus, passenger vehicle, or aircraft. The compressible structure 20 may alternatively be part of any other machine, for example, a wind power generation system. The mounting system 10 may be used to mount objects to any type of compressible structure 20.

Compressible structure 20 may include, for example, a composite laminate structure, and may be formed with materials such as fiberglass, carbon fiber, and epoxy or other resins. As used herein, a composite structure 20 includes a solid material which is composed of two or more substances having different physical characteristics and in which each substance retains its identity while contributing desirable properties to the whole. While the remaining disclosure will refer to the compressible structure 20 as a composite structure 20, it is understood that the compressible structure 20 may be a non-composite structures, such as, for example, a wood structure, wood laminate structure, plastic structure, plastic laminate structure, rubber structure, or any other structure that is formed with a more pliable material compared to the attachment elements of the mounting system 20.

In one embodiment, the mounting system 10 may include an interior plate 12 and an exterior plate 14. The mounting system 10 may further include an installation fixture 28, not shown in FIG. 1, and other components using during the installation of interior plate 12 and exterior plate 14. The composite structure 20 may have a first surface 19 and a second surface 21. The interior plate 12 may be mounted on the first surface 19 and the exterior plate 14 may be mounted on the second surface 21.

The interior plate 12, exterior plate 14, and installation fixture 28 may be formed of metal (ferrous or non-ferrous), or any other suitable material (e.g., plastic) that will support the required loads. Further, the interior plate 12, exterior plate 14, and installation fixture 28, need not be formed of the same material.

Objects may be mounted to the exterior plate 14 of the mounting system 10. For example, if the composite structure 20 is a vehicle chassis, the interior plate 12 may be mounted on the interior of the vehicle chassis and objects on the exterior of the vehicle chassis may be mounted to the exterior plate 14. In one embodiment, a wheel suspension system may be mounted to the exterior plate 14. In other embodiments, objects may be mounted to the interior plate 12 instead of the exterior plate 14, or both to the interior plate and exterior plate.

The interior plate 12 may include bosses 18 that protrude from the interior plate 12. The bosses 18 may be machined features of the interior plate 12 or may be secondarily attached features such as welded shims, standoffs, or bosses. After the interior plate 12 has been mounted to the first surface 19 of the composite structure 20, the bosses 18 may protrude into holes extending through the composite structure 20. Fasteners 22 (e.g. bolts) may pass through holes in the exterior plate 14 and screw into or otherwise fit within the bosses 18 of the interior plate 12 to mount the exterior plate 14 to the second surface 21 of the composite structure 20.

Figure 2B:
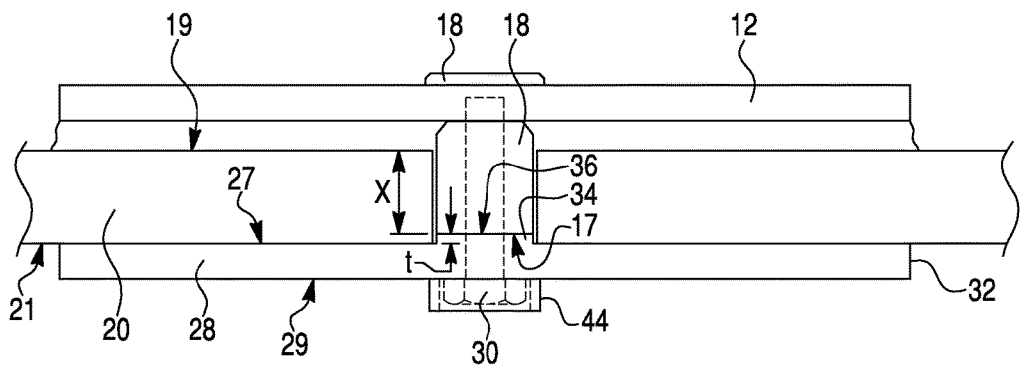
FIG. 2B is a schematic cross-section view of an interior plate and an installation fixture coupled to a compressible structure, according to an exemplary embodiment.
Figure 2C:
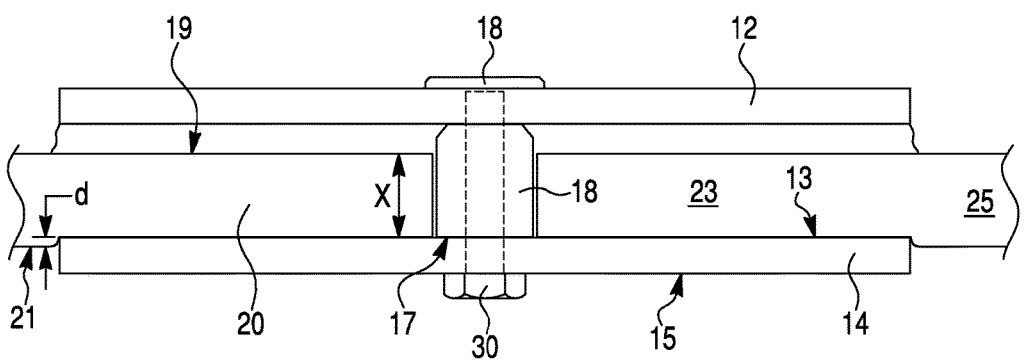
FIG. 2C is cross-section view of section 2C-2C of FIG. 1.

Referring to FIGS. 2A-2C, components of a mounting system 10 for mounting objects to a composite structure 20 are shown during various stages of a method of installation. The method will be described below in greater detail after describing the components' structural features. FIGS. 2A and 2B illustrate stages of the installation process. FIG. 2C is an overhead view of plane 2C-2C shown in FIG. 1.

FIG. 2A illustrates an interior plate 12 coupled to the first surface 19 of the composite structure 20. The interior plate 12 may have a contact surface 9 and an interior surface 11. A gap 24 between a contact surface 9 of the interior plate 12 and the first surface 19 of the composite structure 20 may be filled with glue.

In other embodiments, the interior plate 12 and the composite structure 20 may be coupled using other types of adhesives, bolts, screws, nails, or any other suitable attachment mechanism. In some embodiments, there may be no gap 24.

One or more bosses 18 may be provided with interior plate 12, as described in further detail in connection with FIGS. 7A and 7B. In one embodiment, the bosses 18 may include a flange 56. The bosses 18 of the interior plate 12 may extend through the composite structure 20 a distance "x." Each boss may have an end surface 17. When the interior plate 12 is mounted to the first surface 19 of the composite structure 20, the end surface 17 may be located within a boss hole 26 of the composite structure 20. The boss hole 26 may extend from the first surface 19 to the second surface 21 of the composite structure 20.

FIG. 2B illustrates the interior plate 12 coupled to the first surface 19 of the composite structure 20 and an installation fixture 28 coupled to the second surface 21 of the composite structure 20. The installation fixture 28 may have a contact surface 27 and an exterior surface 29. The contact surface 27 of the installation fixture 28 may face and may contact the second surface 21 of the composite structure 20. The installation fixture 28 may be temporarily coupled to the interior plate 12 by one or more fasteners 30 that pass through the installation fixture 28 and into the bosses 18 of the interior plate 12. The installation fixture 28 may be additionally or alternatively temporarily coupled to the composite structure 20 via fasteners directly into the composite structure 20, glue or other adhesives, screws, nails, or any other suitable temporary attachment mechanism.

The installation plate 28 may include one or more features 34 that protrude from the main body 32 of the installation plate 28 that may function as shims or standoffs. These features 34 may be machined surfaces of the installation plate or secondarily attached features such as welded shims, standoffs, or bosses. Each feature 34 may have a shim surface 36 that may face and contact an end surface 17 of a boss 18. The thickness "t" of the features 34 may correspond to the compression tolerance of the composite laminate 20. The thickness "t" of the features 34 may be determined by the overall surface tolerance on the second surface 21 of composite structure 20, where the installation fixture 28 controls the surface dimensional variations.

FIG. 2C illustrates the interior plate 12 coupled to the first surface 19 of the composite structure 20 and an exterior plate 14 coupled to the second surface 21 of the composite structure 20. During this stage, the installation fixture 28 is no longer coupled to the interior plate 12 or the composite structure 20. The exterior plate 14 may have an inner surface 13 facing the composite structure 20 and an outer surface 15 opposite the inner surface 13. Similar to the installation fixture 28, the exterior plate 14 may be coupled to the interior plate 12 by one or more fasteners 30 that pass through the exterior plate 14 and into the bosses 18 of the interior plate 12. The exterior plate 14 may additionally or alternatively be coupled to the composite structure 20 via fasteners directly into the composite structure 20, glue or other adhesives, screws, nails, or any other suitable attachment mechanism.

During mounting of the exterior plate 14 to the composite structure 20, the composite structure 20 may be reduced in thickness (i.e., compressed) by a distance "d" such that the inner surface 13 of the exterior plate 14 contacts one or more end surfaces 17 of one or more bosses 18. Accordingly, a compressed portion 23 of the composite structure 20 between the interior plate 12 and the exterior plate 14 may have a reduced thickness relative to a non-compressed portion 25 of the composite structure 20 that is not between the interior plate 12 and the exterior plate 14. The amount the compressed portion 23 is reduced in thickness, distance "d," may be equal to or close to the difference between: a) the thickness of the non-compressed portion 25 of the composite structure 20 that is not between the interior plate 12 and the exterior plate 14, and b) the length "x" of the portion of the boss 18 within the boss hole 26 of the composite structure 20. Similarly, the amount the compressed portion 23 is reduced in thickness may be equal to or close to the thickness "t" of the feature 34 of the installation fixture 28.

Figure 3:
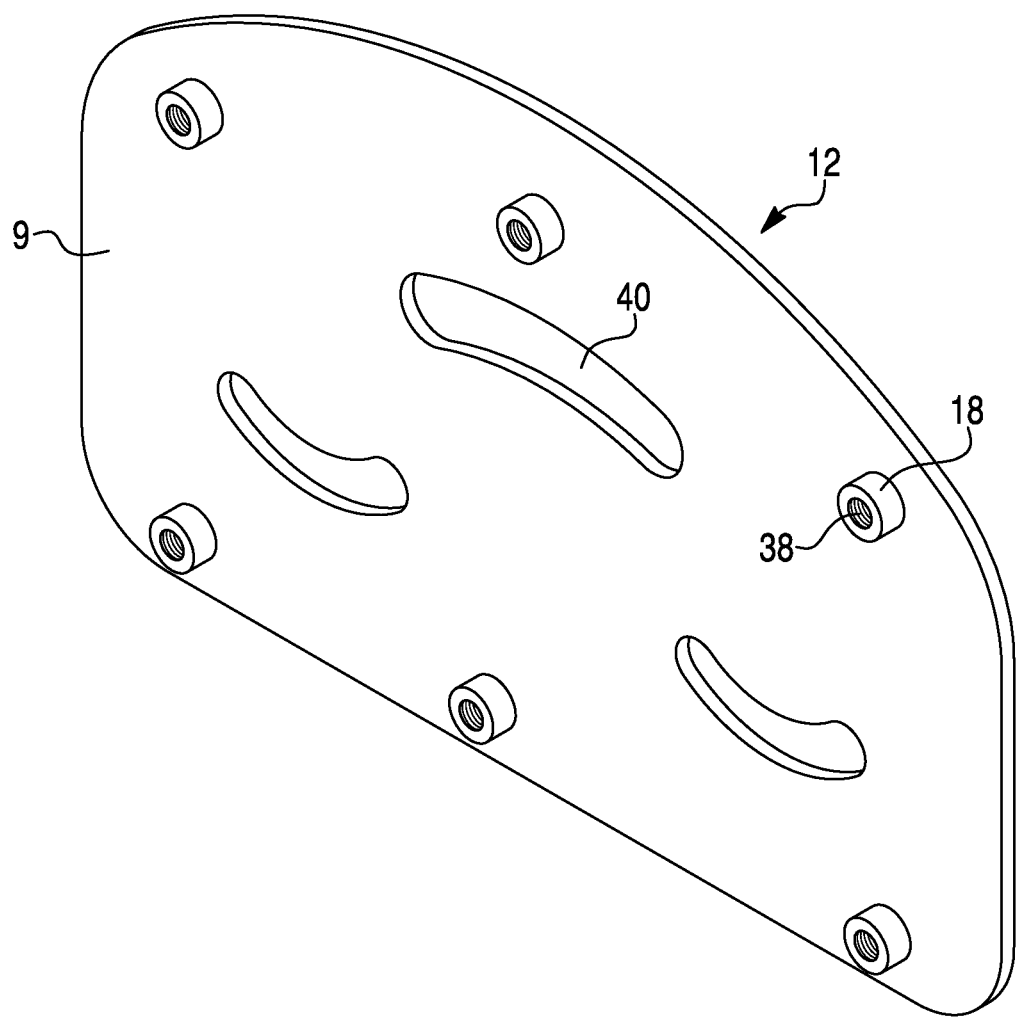
FIG. 3 is an interior plate, according to an exemplary embodiment.

FIG. 3 illustrates an exemplary embodiment of an interior plate 12. The interior plate 12 may include one, two, three, or more bosses 18, and in one embodiment may include six bosses 18. Each boss 18 may have a hole 38 for receiving a fastener such as a bolt or other attachment mechanism. The holes 38 may be threaded or unthreaded, partial blind holes or through holes. Interior plate 12 may further include one or more openings 40 assisting glue or another adhesive to spread evenly along contact surface 9.

Figure 4:
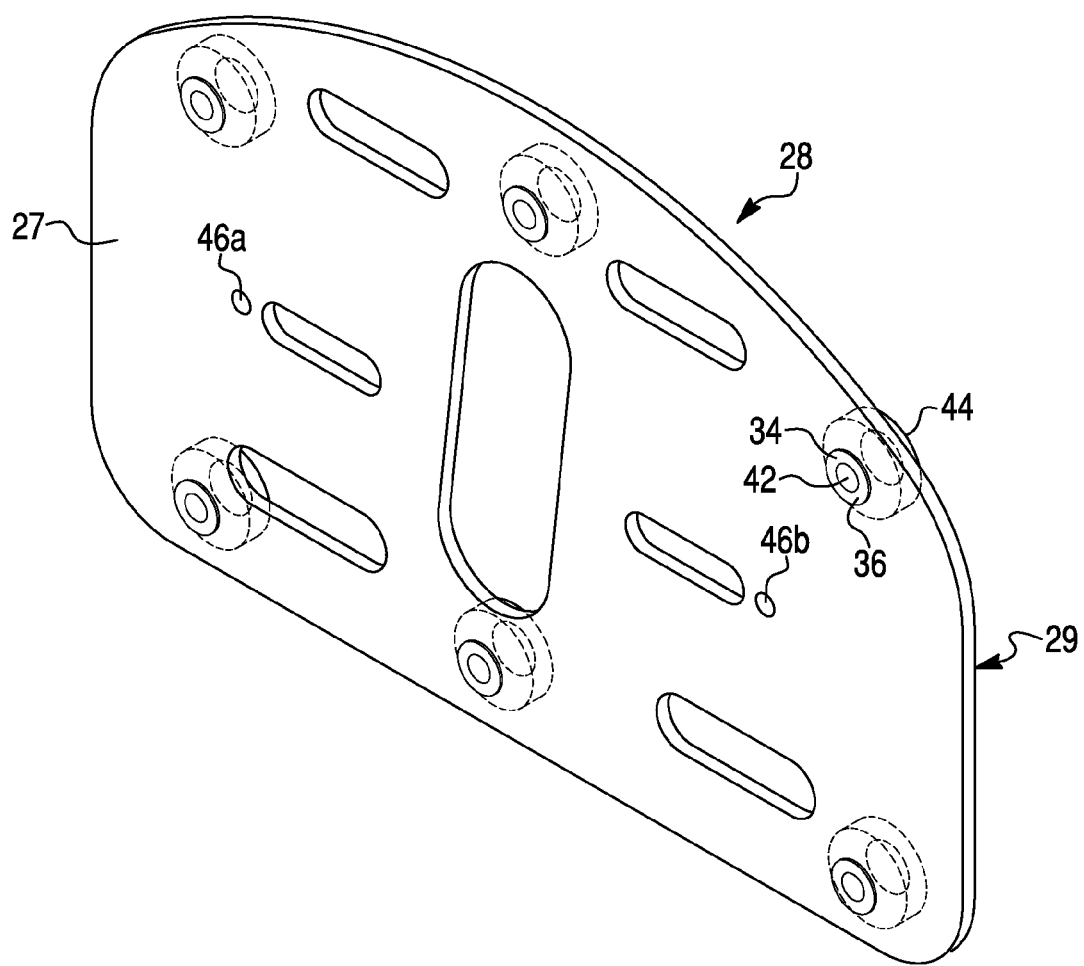
FIG. 4 is an installation fixture, according to an exemplary embodiment.

FIG. 4 illustrates an exemplary embodiment of an installation fixture 28. Installation fixture 28 may include one or more installation fixture holes 42, and in one embodiment may include six installation fixture holes 42. The spacing between the installation fixture holes 42 may correspond to the spacing between the through holes 38 of the interior plate bosses 18. A protruding feature 34 may surround one or more of the installation fixture holes 42. The features 34 may protrude from the contact surface 27 of the installation fixture 28. One or more covers 44 may surround one or more of the installation fixture holes 42 on the exterior surface 29 of the installation fixture 28. The covers 44 may facilitate placement of fasteners 30 or, in another embodiment, may serve as a spacer for fasteners 30. The installation fixture 28 may further include a plurality of other openings that may serve to facilitate coupling of the installation fixture 28 to the composite structure 20 by providing spaces for fasteners or other fasteners.

The installation fixture 28 may further include two or more alignment holes 46a and 46b. The alignment holes 46a, 46b may correspond to location holes or features of the composite structure 20 (not shown) that are precisely positioned on the composite structure 20 to facilitate positioning of the installation fixture 28, and consequently the interior plate 12, relative to the composite structure 20. The location holes of the composite structure 20 are precisely located based on global part of vehicle datum, and may be formed in locator inserts that are installed within the composite structure 20 during the composite mold-based layup process.

The location holes or features may be provided in the second (exterior) surface 21 of the composite structure 20 forming the "A surface" of the composite structure 20—the surface that is most precisely controlled during formation. Alternatively, the location holes may be formed in the less precise "B surface" of the composite structure 20, or in any surface of a non-composite structure.

Figure 5:
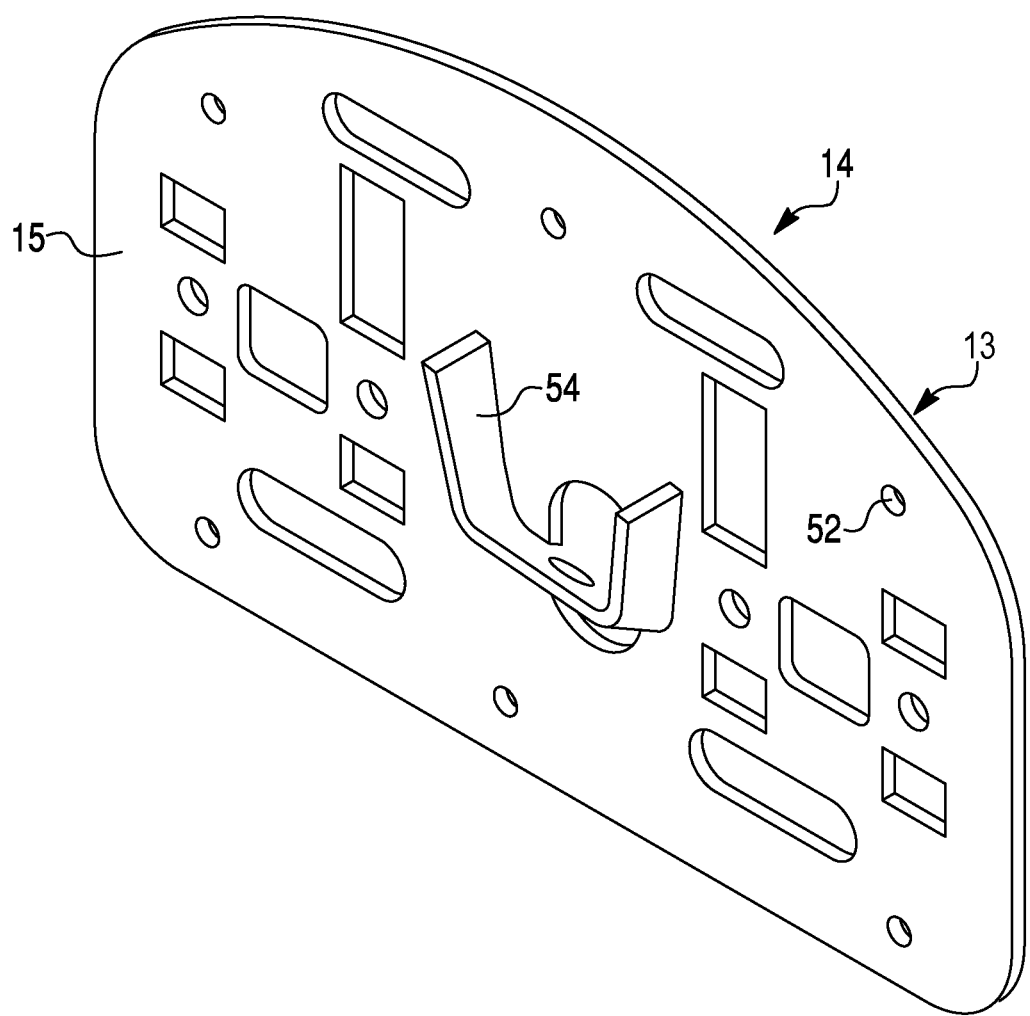
FIG. 5 is an exterior plate, according to an exemplary embodiment.

FIG. 5 illustrates an exemplary embodiment of an exterior plate 14. The exterior plate 14 may include one or more exterior plate holes 52, and in one embodiment, may include six exterior plate holes 52. The exterior plate holes 52 may have a spacing arrangement that corresponds to the spacing between the holes 38 of the interior plate bosses 18 and the spacing between the installation fixture holes 42. The exterior plate 14 may further include a plurality of other openings that may serve to facilitate coupling of the exterior plate 14 to the composite structure 20 by providing spaces for bolts or other fasteners or by allowing glue to spread over inner surface 13 of the exterior plate 14. The exterior plate 14 may also include a mounting arm 54 protruding from the exterior surface 15. The mounting arm 54 may help support objects that are mounted to the composite structure 20 via mounting system 10. It is understood that exterior plate 14 may take many different forms and have different mounting structures depending on the object to be secured to the mounting system 10.

Figure 6:
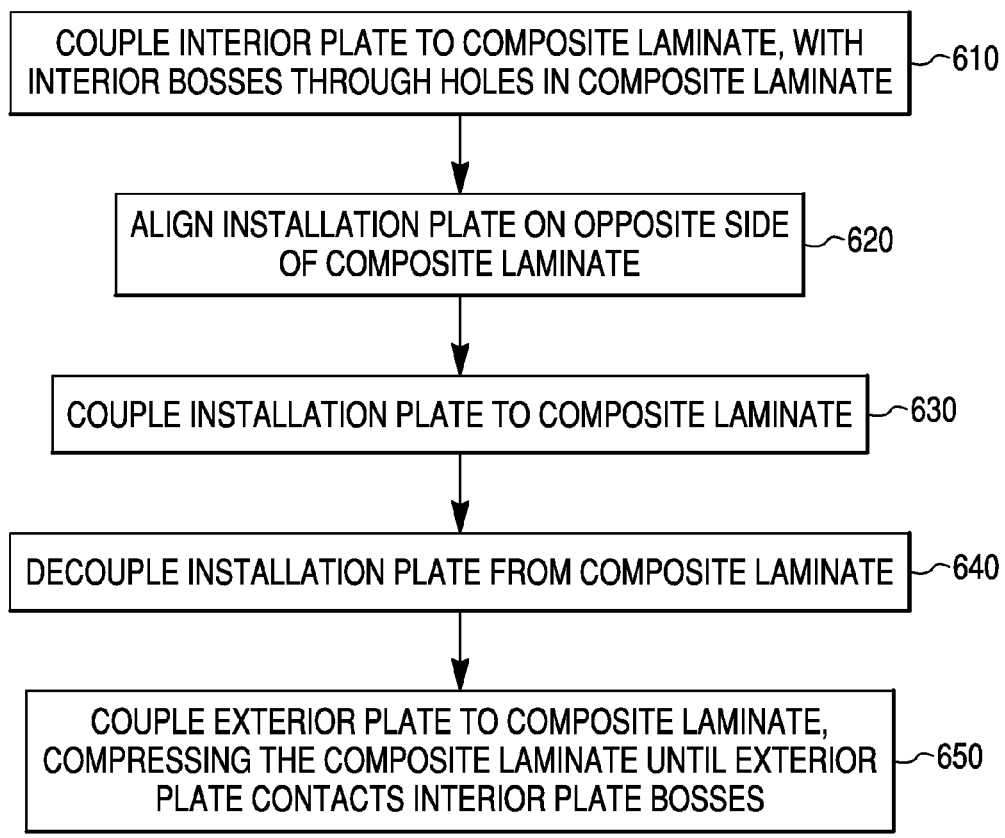
FIG. 6 is a method for installing a mounting system on a compressible structure, according to an exemplary embodiment.

FIG. 6 illustrates one embodiment of a method for installing a mounting system 10 on a composite structure 20. In step 610, the interior plate 12 may be coupled to the composite structure 20. As described above, the interior plate 12 may be coupled to the composite structure 20 using glue or any other suitable attachment mechanism. The contact surface 9 of the interior plate 12 is positioned against the composite structure 20 (or the adhesive) such that the bosses 18 of the interior plate 12 fit through boss holes 26 in the composite structure 20. By receiving the bosses 18, the boss holes 26 can be used to general align the interior plate 12 relative to the composite structure 20. However, as discussed below, more precise positioning of the interior plate 12 may be obtained with the installation fixture 28.

In step 620, the installation fixture 28 may be positioned on the opposite side of the composite structure 20 from the interior plate 12. The contact surface 27 of the installation fixture 28 may face and contact the second surface 21 of the composite structure 20. During step 620, the alignment holes 46a and 46b of the installation fixture 28 may be used to properly position the mounting system 20 by accurately positioning the installation fixture 28. In one embodiment, the installation fixture alignment holes 46a and 46b are aligned with the precisely positioned location holes or features (not shown) formed in the composite structure 20. For example, fasteners (not shown) may be used to pass through both the alignment holes 46a and 46b of the installation fixture 28 and the location holes of the composition structure 20 to accurately position the installation fixture 28 on the composite structure 20. Step 620 may take place simultaneously with step 610 or shortly thereafter (i.e., before the adhesive fully dries) to facilitate accurate positioning of the interior plate 12 relative to the composite structure 20.

In step 630, the installation fixture 28 may be coupled to the interior plate 12 by placing fasteners 30 through the installation fixture holes 42 and into the bosses 18 of the interior plate 12. Accordingly, the installation fixture 28 is coupled to and mounted to the second surface 21 of the composite structure 20, with the features 34 protruding from the contact surface 27 of the installation fixture 28 and into the boss holes 26 of the composite structure 20. Bolts attaching directly to or into threaded inserts within the composite structure 20, glue or other adhesives, or other fasteners may be used additionally or alternatively to couple the installation fixture 28 to the composite structure 20. The positioning of the installation fixture 28 (using the alignment holes 46a and 46b) and subsequent coupling of the installation fixture 28 to the interior plate 12 may ensure that the interior plate 12 is in the desired position with respect to the composite structure 20. Correct positioning of the interior plate 12 may in turn ensure that the exterior plate 14 and any objects mounted onto the exterior plate 14 are properly aligned relative to the composite structure 20.

In step 640, the installation fixture 28 may be decoupled from the second surface 21 of the composite structure 20. This decoupling step may include unscrewing or removing bolts, temporary fasteners, breaking an adhesive bond, or otherwise detaching other attachment mechanisms.

In step 650, the exterior plate 14 is coupled to the second surface 21 of the composite structure 20. The exterior plate 14 may be coupled to the composite structure 20 by placing fasteners 30 through exterior plate holes 52, through boss holes 26 in the composite structure 20, and into bosses 18 of the interior plate 12. The fasteners may be tightened until the inner surface 13 of the exterior plate 14 contacts one or more end surfaces 17 of bosses 18 (see FIG. 2C). As the exterior plate inner surface 13 comes into contact with boss end surfaces 17, the composite structure 20 compresses. In one embodiment, the composite structure 20 compresses a distance "d." As described above, distance "d" may correspond to the difference between the non-compressed portion 25 of the composite structure 20 and the length "x" of the portion of a boss 18 within the boss hole 26 of the composite structure 20. The distance "d" may also correspond to the thickness "t" of features 34 of the installation fixture 28. In alternative embodiments, the inner surface 13 of the exterior plate 14 may be brought into contact with the end surfaces 17 of the bosses 18 using any device that would exert enough force to compress the composite structure 20 and bring these surfaces together. Fasteners going directly into the composite structure 20, glue or other adhesives, or other fasteners may be used additionally or alternatively to couple the exterior plate 14 to the composite structure 20.

The features 34 may be manufactured with a thickness "t" corresponding to a tolerance measurement of the composite structure 20. In one embodiment, the tolerance measurement is the compression tolerance of the composite structure 20. The correspondence between the thickness "t" of the features 34 and the compression tolerance of the composite structure 20 may maximize the load the composite structure 20, with the installed mounting system 10, is able to support. The compressed portion 23 of the composite structure 20 between the interior plate 12 and the exterior plate 14 may be able to withstand the compression "d" caused by the exterior plate 14 while still maintaining its load bearing properties. By bringing the exterior plate 14 into direct contact with end surfaces 17 of the installation fixture bosses 18, and by taking advantage of the composite structure's compression tolerance, objects may be mounted to the composite structure 20 with a tighter tolerance than may be obtainable with conventional mounting systems.

Further, the disclosed mounting system 10 facilitates precisely locating structures on the composite structure 20 when the composite structure itself may be relatively imprecise in its formation. For example, as discussed above, the proper locational placement of the mounting system with respect to the composite structure 20 may be facilitated by the proper placement of location holes in the composite structure 20, and the precise formation of the interior plate 12, exterior plate 14, and installation fixture 28.

Figure 7A:
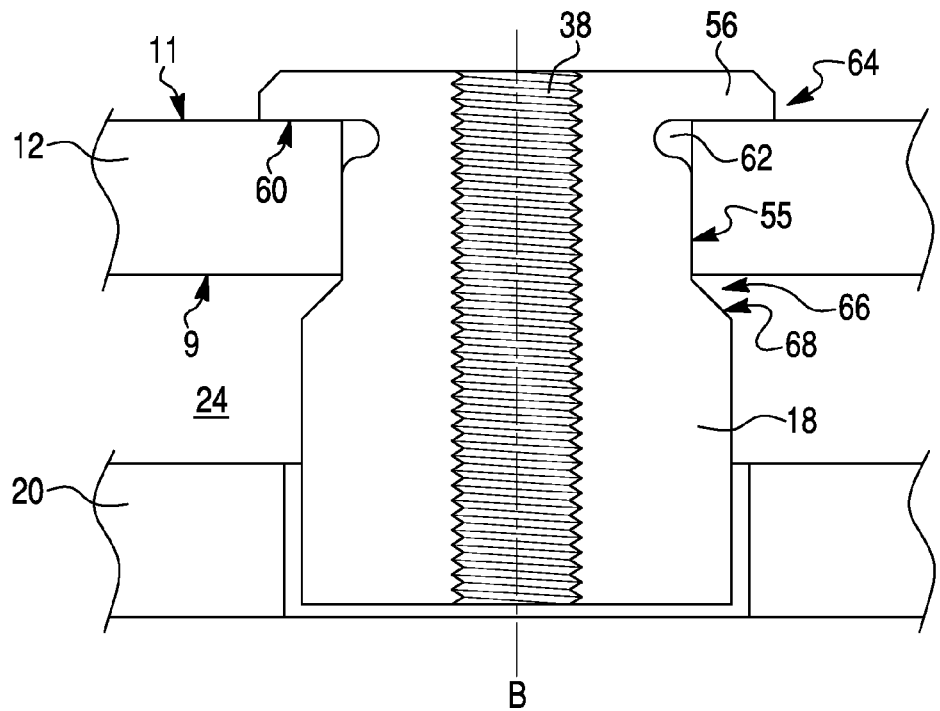
FIG. 7A is a first exemplary embodiment of a boss coupled to an interior plate.

FIG. 7A illustrates a first embodiment of a boss 18 which is a feature of an interior plate 12. Various portions of the boss 18 may be generally cylindrical in shape about main axis B. In other embodiments, portions of the boss 18 may be square, oval, or other shapes, or the boss may be a machined feature of the interior plate 12. A portion of the boss 18 may pass through a boss retaining hole 55 in the interior plate 12. As described above, the boss 18 may include a hole 38. The boss 18 may include a flange 56. The flange 56 may be circumferential around the boss 18 and may extend radially outward from a main axis "B" of the boss 18. In one embodiment, the flange 56 may be chamfered. A support surface 60 of the flange 56 may face and contact the interior surface 11 of the interior plate 12. The flange 56 may help prevent the boss 18 from separating from the interior plate 12 during tension loads along axis B. The boss 18 may further include a circumferential undercut radius 62. In one embodiment, the portion of the boss 18 passing through the boss retaining hole 55 of the interior plate 12 may include the undercut radius 62. The undercut radius 62 may alleviate stresses during tension loads along axis B.

The boss 18 may be mechanically fastened to the interior plate 12 or may be welded to the interior plate 12 at two circumferential weld locations 64 and 66. The first weld location 64 may be along the chamfered flange 56 of the boss 18. The first weld location 64 may further help prevent separation of boss 18 from the interior plate 12 during tension loads along axis B. The second weld location 66 may be along the contact surface 9 of the interior plate 12. The second weld location 66 may help prevent separation of boss 18 from interior plate 12 during torsional loads around axis B of the boss 18.

Figure 7B:
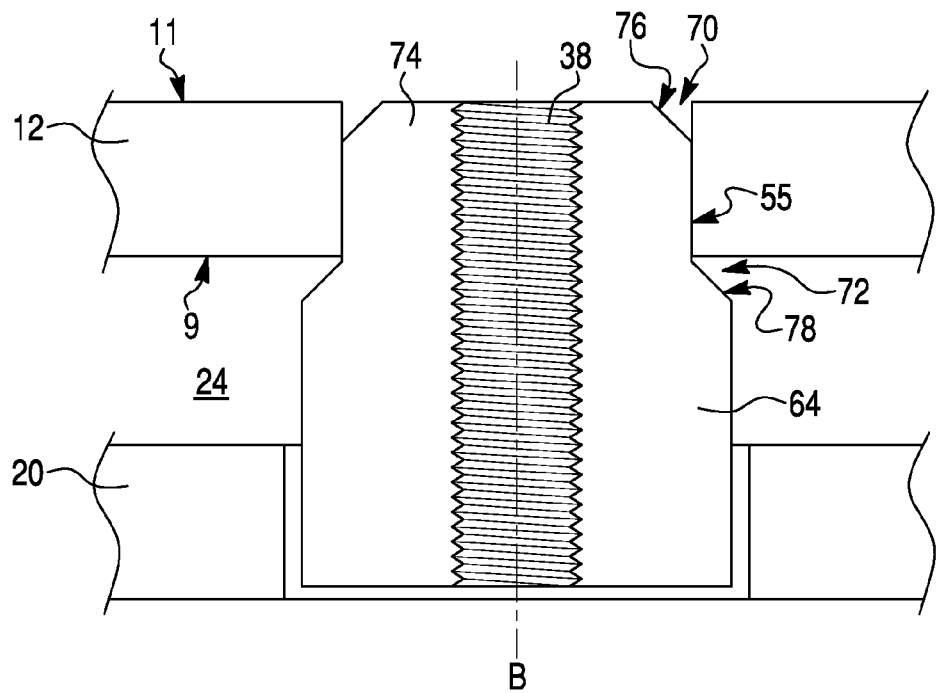
FIG. 7B is a second exemplary embodiment of a boss coupled to an interior plate.

FIG. 7B illustrates an alternative boss embodiment, boss 64, coupled to an interior plate 12. Similar to the embodiment of FIG. 7A, various portions of the boss 64 may be generally cylindrical in shape about main axis B. In other embodiments, portions of the boss 64 may be square, oval, or other shapes. Furthermore, boss 64 may include a hole 38. The holes 38 disclosed herein can be sized and threaded to match the desired bolt or other fastener. Similar to boss 18 of FIG. 7A, the boss 64 may be welded to the interior plate 12 at two circumferential weld locations. First weld location 70 may be circumferential around a first end 74 of the boss 64. The first weld location 70 may help prevent separation of the boss 64 from the interior plate 12 during normal loads perpendicular to axis B. Second weld location 72 may be similar to the second weld location 66 of the embodiment of FIG. 7A, with an edge 78 of the boss 64 forming one side of the arrow and the contact surface 9 of the interior plate 12 forming the other side of the arrow. Second weld location 72 may help prevent separation of boss 64 from interior plate 12 during torsional loads around axis B of boss 64.

While principles of the present disclosure are described herein with reference to illustrative embodiments for particular applications, it should be understood that the disclosure is not limited thereto. For example, while the discussion above refers to mounting for a composite structure, is it understood that the systems and methods are applicable to any compressible structure. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

We claim:

1. A mounting system, comprising:
a compressible structure having a first surface, a second surface, and at least one boss hole extending through the compressible structure from the first surface to the second surface, wherein the compressible structure is a composite structure;
a first plate mounted on the first surface of the compressible structure, wherein the first plate includes a first boss protruding from the first plate and into the first boss hole of the compressible structure; and
a second plate mounted on the second surface of the compressible structure and secured to the first plate in contact with the first boss of the first plate;
wherein the compressible structure is compressed a predetermined amount as a function of a length of the first boss,
wherein the first plate includes at least one additional boss protruding from the first plate and into a corresponding additional boss hole of the compressible structure, and
wherein the compressible structure is a vehicle chassis, and the second plate includes one or more mounting structures configured to support objects mounted to the mounting system.

2. The system of claim 1, wherein the compressible structure is a composite laminate structure of a bus and the composite laminate structure includes fiberglass.

3. The system of claim 1, wherein the second plate is mounted on the second surface of the composite structure with a fastener passing through the second plate and into the boss of the first plate.

4. The system of claim 1, wherein the first boss includes a circumferential flange extending radially outward from a main axis of the first boss such that the flange rests on an interior surface of the first plate.

5. The system of claim 1, wherein the second plate contacts an end surface of the first boss.

6. The system of claim 1, wherein a portion of the compressible structure between the first plate and the second plate has a reduced thickness relative to a portion of the compressible structure that is not between the first plate and the second plate.

7. A system for mounting objects to a composite structure of a vehicle, comprising:
a composite structure having a first surface, a second surface, and a boss hole extending through the composite structure from the first surface to the second surface;
a first plate mounted on the first surface of the composite structure, wherein the first plate includes a boss protruding from the first plate and into the boss hole of the composite structure; and
a second plate mounted on the second surface of the composite structure, wherein an inner surface of the second plate rests on an end surface of the boss,
wherein the composite structure between the first plate and the second plate has a region of constant thickness, the region of constant thickness having a smaller thickness value than a portion of the composite structure that is not between the first plate and the second plate, and
wherein the second plate includes one or more mounting structures configured to support objects mounted to the system.

8. The system of claim 7, wherein a difference in thickness between the portion of the composite structure that is not between the first plate and the second plate and the region of constant thickness is a difference between: a) a thickness of the portion of the composite structure that is not between the first plate and the second plate, and b) a length of a portion of the boss within the boss hole of the composite structure.

9. The system of claim 7, wherein the second plate is mounted on the second surface of the composite structure with a fastener passing through the second plate and into the boss of the first plate.

10. The system of claim 7, wherein the boss includes a circumferential flange extending radially outward from a main axis of the boss such that the flange rests on an outer surface of the first plate.

11. The system of claim 7, wherein a portion of the boss passes through a boss retaining hole in the first plate, and the portion includes a circumferential undercut radius.

12. The system of claim 7, wherein the one or more mounting structures of the second plate is configured to support a suspension system of the vehicle.

13. The system of claim 7, wherein composite structure includes fiberglass.

14. A method for installing a mounting system on a compressible structure, comprising:
coupling a first plate having a plurality of bosses to a first surface of the compressible structure such that each boss of the plurality of bosses protrudes from the first plate and into a corresponding boss hole of a plurality of boss holes in the compressible structure; and
coupling an second plate to a second surface of the compressible structure, wherein the coupling step includes (a) causing an inner surface of the second plate to contact an end surface of the boss, and (b) reducing a thickness of a portion of the compressible structure between the first plate and the second plate relative to a thickness of a portion of the compressible structure that is not between the first plate and the second plate, and
wherein the compressible structure includes fiberglass and is at least a portion of a vehicle chassis.

15. The method of claim 14, further comprising, before the step of coupling the second plate to the second surface of the compressible structure, coupling an installation fixture having at least one feature to the second surface of the compressible structure such that the at least one feature protrudes from the installation fixture and into one of the plurality of boss holes in the compressible structure, wherein a thickness of the feature corresponds to a desired compression of the compressible structure, wherein the desired compression is a function of the thickness of the feature.

16. The method of claim 15, wherein the portion of the compressible structure between the first plate and the second plate is compressed by an amount equal to the thickness of the feature of the installation fixture.

17. The method of claim 14, further comprising mounting a wheel suspension system to the second plate.

* * * * *